(12) United States Patent
Kawamura et al.

(10) Patent No.: US 9,111,649 B2
(45) Date of Patent: Aug. 18, 2015

(54) TAMPER RESISTANT SEMICONDUCTOR DEVICE WITH ACCESS CONTROL

(75) Inventors: Yoshifumi Kawamura, Kanagawa (JP);
Hirofumi Nakano, Kanagawa (JP);
Hiroyuki Kawai, Kanagawa (JP)

(73) Assignee: RENESAS ELECTRONICS CORPORATION, Kanagawa (JP)

( * ) Notice: Subject to any disclaimer, the term of this patent is extended or adjusted under 35 U.S.C. 154(b) by 384 days.

(21) Appl. No.: 13/105,324

(22) Filed: May 11, 2011

(65) Prior Publication Data

US 2011/0289293 A1 Nov. 24, 2011

(30) Foreign Application Priority Data

May 21, 2010 (JP) ................................. 2010-117260

(51) Int. Cl.
*G06F 12/14* (2006.01)
*G06F 21/79* (2013.01)
*G11C 29/00* (2006.01)
*G06F 12/02* (2006.01)

(52) U.S. Cl.
CPC .......... *G11C 29/846* (2013.01); *G06F 12/0246* (2013.01); *G06F 12/1416* (2013.01); *G06F 12/1441* (2013.01); *G06F 21/79* (2013.01); *G06F 2212/7201* (2013.01); *G06F 2212/7209* (2013.01)

(58) Field of Classification Search
CPC ......... G06F 12/14; G06F 21/78; G06F 21/79; G06F 12/1441; G06F 12/1433; G06F 12/1491; G06F 21/80; G06F 12/1416; G06F 12/1425
USPC ....................................................... 711/163
See application file for complete search history.

(56) References Cited

U.S. PATENT DOCUMENTS

| | | | | |
|---|---|---|---|---|
| 5,687,354 | A | * | 11/1997 | Koo ............................... 711/163 |
| 6,249,850 | B1 | * | 6/2001 | Kato .............................. 711/163 |
| 6,751,716 | B2 | | 6/2004 | Sumitani et al. |
| 6,842,386 | B2 | | 1/2005 | Suzuki |
| 2007/0208955 | A1 | | 9/2007 | Okabe et al. |
| 2008/0022396 | A1 | * | 1/2008 | Kado .............................. 726/19 |

FOREIGN PATENT DOCUMENTS

| | | | | |
|---|---|---|---|---|
| JP | 01266645 | A | * 10/1989 | ............. G06F 12/14 |
| JP | 0474240 | A | * 3/1992 | ............. G06F 12/14 |
| JP | 2001-306400 | | 11/2001 | |
| JP | 2003-122638 | A | 4/2003 | |
| JP | 2007-233725 | A | 9/2007 | |

OTHER PUBLICATIONS

Japanese Office Action issued in Application No. 2010-117260 dated Jan. 7, 2014.

* cited by examiner

*Primary Examiner* — Charles Rones
*Assistant Examiner* — Andrew Russell
(74) *Attorney, Agent, or Firm* — McDermott Will & Emery LLP (57) ABSTRACT

There is provided a semiconductor device which is simple in configuration and resistant to tampering. A user input unit receives an authentication code input by a user. A CPU determines whether a user's access is legal based on the input authentication code and activates an enable signal if the user's access is legal. A normal row decoder decodes the row address specified by the CPU and selects a normal memory cell of any row based on the result of decode. A redundancy row decoder prohibits the selection by the normal row decoder when the specified row address agrees with the row address of a predetermined normal memory cell only if the enable signal is activated and selects a redundant memory cell of any row.

5 Claims, 7 Drawing Sheets

TAMPER RESISTANT SEMICONDUCTOR DEVICE WITH ACCESS CONTROL

CROSS-REFERENCE TO RELATED APPLICATIONS

The disclosure of Japanese Patent Application No. 2010-117260 filed on May 21, 2010 including the specification, drawings and abstract is incorporated herein by reference in its entirety.

BACKGROUND

The present invention relates to a semiconductor device and, in particular, to the semiconductor device with tamper resistance.

Data of which tamper resistance is required, such as an encryption key and personal information, can be stored in a semiconductor device. Some semiconductor devices have a function of protecting data of which tamper resistance is required from illegal access.

A semiconductor device according to Patent Document 1, for example, can set a security function for deactivating a memory space and cancel a security function for activating the memory space. In the semiconductor device, the security function is set such that an address identified by an input address signal agrees with a key address in which it is previously known that the key address is not operated in specific situations or a key address in which it is previously known that the key address is operated in specific situations.

[Patent Document 1] Japanese Unexamined Patent Application Publication No. 2001-306400

SUMMARY

In the semiconductor device according to Patent Document 1, however, a dedicated complicated security circuit needs to be provided to increase the scale of the device.

The object of the present invention is to provide a semiconductor device which is simple in configuration and resistant to tampering.

A semiconductor device according to an embodiment of the present invention includes an input unit configured to receive an authentication code input by a user; a control unit configured to determine whether a user's access is legal based on the input authentication code and activate an enable signal if the user's access is legal; a plurality of normal memory cells; a plurality of redundancy memory cells; a normal decoder configured to decode the address specified by the control unit and select any of the normal memory cells based on the result of decode; and a redundancy decoder configured to prohibit the selection by the normal decoder when the specified address agrees with the address of a predetermined normal memory cell only if the enable signal is activated and select any of the normal memory cells.

According to the semiconductor device of an embodiment of the present invention, tamper resistance can be realized by a simple configuration.

DETAILED DESCRIPTION

The embodiments of the present invention are described below with reference to the accompanying drawings.

First Embodiment

Figure 1:
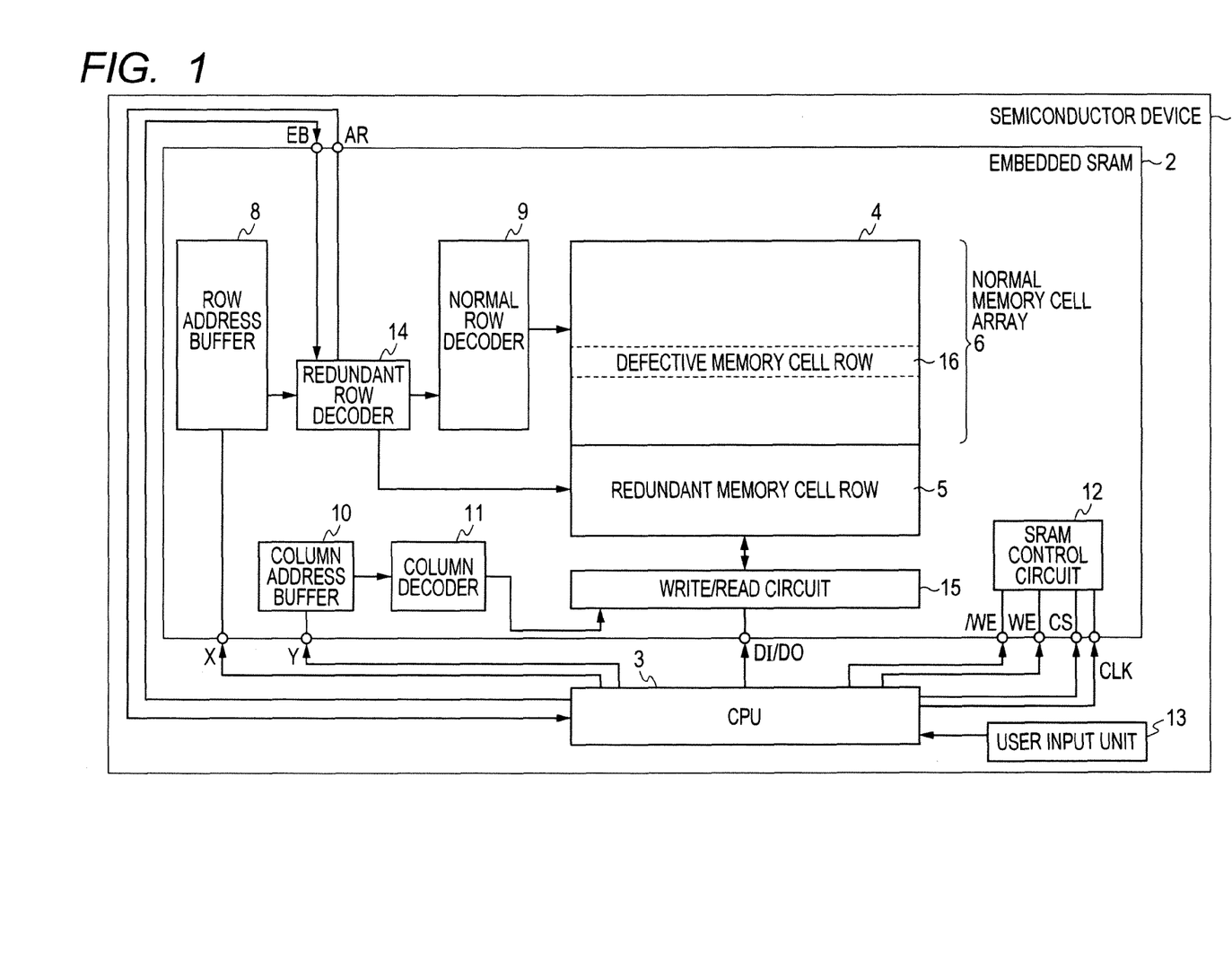
FIG. 1 is a block diagram showing a configuration of a semiconductor device according to a first embodiment of the present invention.

FIG. 1 is a block diagram showing a configuration of a semiconductor device according to a first embodiment of the present invention.

Referring to FIG. 1, a semiconductor device 1 includes a built-in SRAM 2, a central processing unit (CPU) 3 as a control unit, and a user input unit 13.

The built-in SRAM 2 includes a memory cell array 4, a row address buffer 8, a column address buffer 10, a normal row decoder 9, a column decoder 11, a redundant row decoder 14, a write/read circuit 15, and an SRAM control circuit 12.

The user input unit 13 receives an authentication code input by a user. Any of a pass word of the user, a device ID of the built-in SRAM 2, and information about a user's finger print, for example, or a combination of those is used as the authentication code.

The CPU 3 collates the authentication code input from the user input unit 13 with the previously stored authentication code to determine the user's access is legal. The CPU 3 asserts an enable signal EB to be a level "H" if the access is legal and negates the enable signal EB to be a level "L" if the access is illegal.

The CPU 3 outputs a row address signal X, a column address signal Y, a chip selection signal CS, a read request signal /WE and a write request signal WE.

The CPU 3 outputs again the read request signal /WE if read data do not arrive from the write/read circuit 15 after a predetermined time period passes after the read request signal /WE has been output. The CPU 3 outputs read request signal /WE a predetermined number of times and, if read data DO do not arrive, the read request is cancelled.

The SRAM control circuit 12 receives a clock CLK, the chip selection signal CS, the read request signal /WE from the CPU 3, and the write request signal WE and totally controls the built-in SRAM. The SRAM control circuit 12 makes effective access to the built-in SRAM if the chip selection signal CS is activated. The SRAM control circuit 12 outputs the read request signal/WE and the write request signal WE to the write/read circuit 15.

The memory cell array 4 includes a plurality of SRAM cells and is comprised of a normal memory cell array 6 and a redundant memory cell row 5.

The normal memory cell array 6 includes a plurality of normal memory cells arranged in a matrix form. The normal memory cell array 6 includes a defective memory cell row 16.

The defective memory cell row 16 includes at least one bit defective memory. A defective row in the normal memory cell array 6 is found in a test before shipment and the row is set as the defective memory cell row 16.

The redundant memory cell row 5 is arranged in one row and includes a plurality of redundant memory cells. The memory cell of the redundant memory cell row 5 stores data which have to be made secret and essentially stored in the memory cell of the defective memory cell row 16 according to the order of an address.

The row address buffer 8 receives the row address signal X provided by the CPU 3. The column address buffer 10 receives the column address signal Y provided by the CPU 3.

When the write/read circuit 15 receives the write request signal WE, the write/read circuit 15 writes write data DI provided by the CPU 3 in a memory cell positioned in a column specified by the column decoder 11 in the memory cell array 4 and in a row specified by the normal row decoder 9 or the redundant row decoder 14.

When the write/read circuit 15 receives the read request signal /WE, the write/read circuit 15 reads data from a memory cell positioned in a column specified by the column decoder 11 in the memory cell array 4 and in a row specified by the normal row decoder 9 or the redundant row decoder 14. When the write/read circuit 15 is successful in reading the data, in other words, when the data read by amplifying the electric potential of a bit line pair by a sense amplifier is fixed, the write/read circuit 15 outputs the read data to the CPU 3 as the read data DO.

the normal row decoder 9 decodes the row address signal X and drives a word line in any row in the normal memory cell array 6 based on the decoded result, thereby selecting a normal memory cell arranged in the row.

The column decoder 11 decodes the column address signal Y. The redundant row decoder 14 includes a program circuit. The program circuit includes a plurality of fuse elements. Some of the plural fuse elements are blown by a tester in a test before shipment, thereby programming the row address of the defective memory cell row 16.

In a case where an enable signal EB sent from the CPU 3 is in a level "H" (i.e., in a case where the user's access is legal), the redundant row decoder 14 drives the word line of the redundant memory cell row 5 to select the redundant memory cell arranged in the redundant memory cell row 5 and prohibit the drive of the word line by the normal row decoder 9, i.e., the selection of the normal memory cell when a row address provided by the row address signal X provided by the row address buffer 8 agrees with the row address in the programmed defective memory cell row 16. Therefore, in this case, the redundant memory cell row 5 is accessed. For a read access, data which have to be made secret and are stored in the redundant memory cell row 5 are read. For a write access, since data are written in the redundant memory cell row 5, the data which have to be made secret are changed.

In a case where the enable signal EB sent from the CPU 3 is in a level "L" (i.e., in a case where the user's access is illegal), the redundant row decoder 14 does not drive the word line of the redundant memory cell row 5 when the row address provided by the row address signal X provided by the row address buffer 8 agrees with the row address in the programmed defective memory cell row 16. Therefore, in this case, the defective memory cell row 16 is accessed. For a read access, a reading error merely occurs from the defective memory cell row 16, and data which have to be made secret are not read. For a write access, writing data into the defective memory cell row 16 is merely executed and the data which have to be made secret are not interpolated.

In a case where the enable signal EB sent from the CPU 3 is in a level "L," the redundant row decoder 14 outputs an alarm signal AR to the CPU 3 when the row address provided by the row address signal X provided by the row address buffer 8 agrees with the row address in the programmed defective memory cell row 16.

As described above, according to the semiconductor device of the first embodiment of the present invention, if the user's access is illegal, the defective memory cell row can be accessed by a simple configuration in which the redundant row decoder is controlled by the enable signal EB representing the legality of an authentication code input by the user. This allows preventing reading or interpolating the data which have to be made secret. If the user's access is illegal and, as a result, the defective memory cell row is accessed, the redundant row decoder outputs the alarm signal to the CPU. Thereby, the CPU can automatically turn off a power supply or lock a key board to prevent an illegal access.

[Modification of First Embodiment]

In the first embodiment, although each of the defective memory cell row and the redundant memory cell row has one row, the embodiment is not limited thereto. Each of the defective memory cell row and the redundant memory cell row may have a plurality of rows.

Second Embodiment

Figure 2:
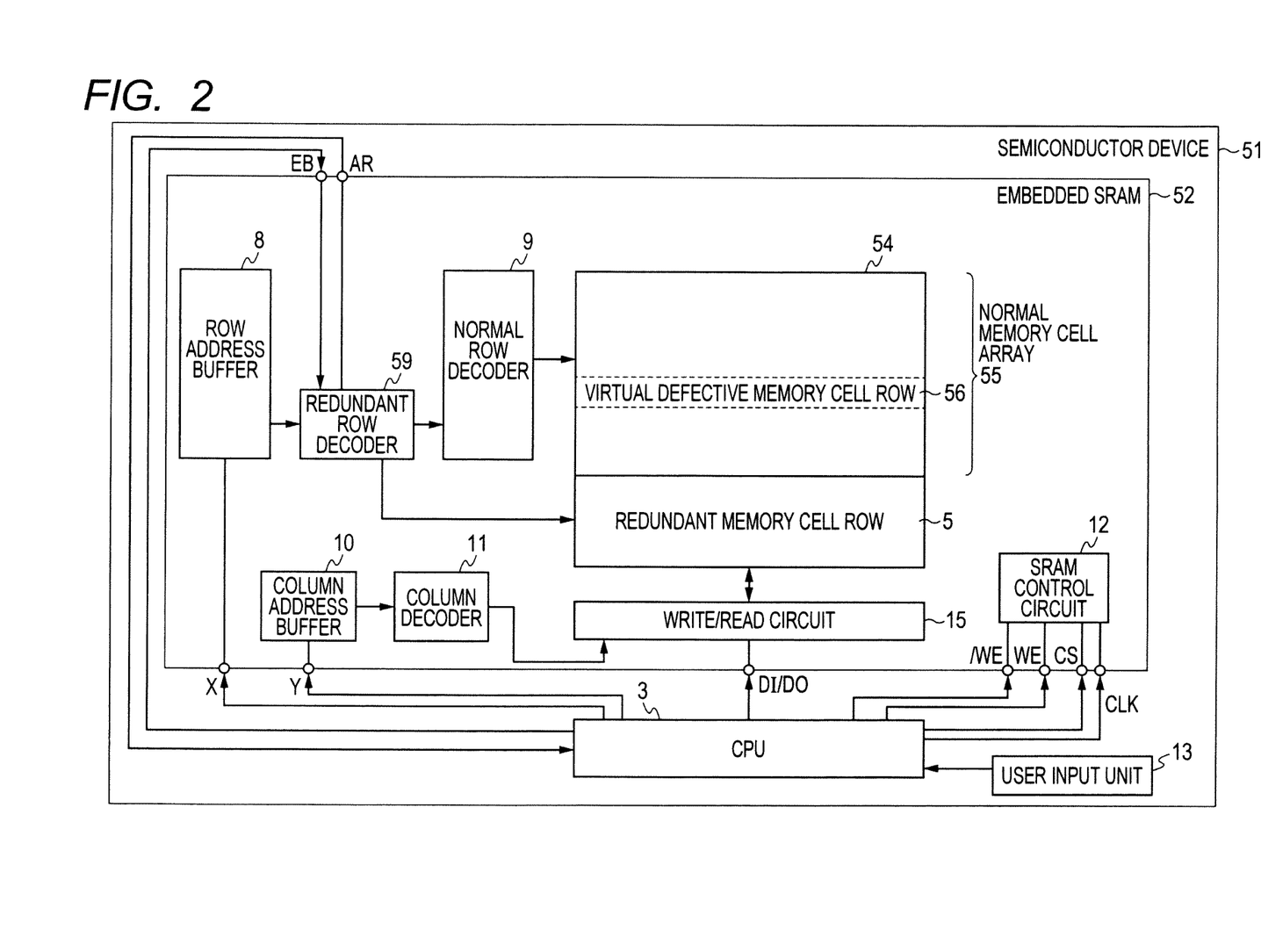
FIG. 2 is a block diagram showing a configuration of a semiconductor device according to a second embodiment of the present invention.

FIG. 2 is a block diagram showing a configuration of a semiconductor device according to a second embodiment of the present invention.

A semiconductor device 51 shown in FIG. 2 is different from the semiconductor device 1 shown in FIG. 1 in the following points. A memory cell array 54 includes a plurality of SRAM cells and is comprised of a normal memory cell array 55 and a redundant memory cell row 5.

The normal memory cell array 55 includes a plurality of normal memory cells arranged in a matrix form. The normal memory cell array 55 includes a virtual defective memory cell row 56. One row in the normal memory cell array 55 is randomly selected in a test before shipment and the selected row is set in the virtual defective memory cell row 56. A don't care value, i.e., a dummy value is written in all the virtual defective memories of the virtual defective memory cell row 56 by a tester. Alternatively, a don't care value, i.e., a dummy value is written only in a part of the virtual defective memories of the virtual defective memory cell row 56 by a tester.

The redundant memory cell row 5 is arranged in one row and includes a plurality of redundant memory cells. The memory cell of the redundant memory cell row 5 stores data which have to be made secret and essentially stored in the memory cell of the defective memory cell row 56 according to the order of an address.

The redundant row decoder 59 includes a program circuit. The program circuit includes a plurality of fuse elements. Some of the plural fuse elements are blown by a tester in a test before shipment, thereby programming the row address of the defective memory cell row 56.

In a case where the enable signal EB sent from the CPU 3 is in a level "H" (i.e., in a case where the user's access is legal), the redundant row decoder 59 drives the word line of the redundant memory cell row 5 to select the redundant memory cell arranged in the redundant memory cell row 5 and prohibit the drive of the word line by the normal row decoder 9, i.e., the selection of the normal memory cell when the row address provided by the row address signal X provided by the row address buffer 8 agrees with the row address in the programmed virtual defective memory cell row 56.

Therefore, in this case, the redundant memory cell row 5 is accessed. For a read access, data which have to be made secret and are stored in the redundant memory cell row 5 are read. For a write access, since data are written in the redundant memory cell row 5, the data which have to be made secret are changed.

In a case where the enable signal EB sent from the CPU 3 is in a level "L" (i.e., in a case where the user's access is illegal), the redundant row decoder 59 does not drive the word line of the redundant memory cell row 5 when the row address provided by the row address signal X provided by the row address buffer 8 agrees with the row address in the programmed virtual defective memory cell row 56. Therefore, in this case, the virtual defective memory cell row 56 is accessed. For a read access, a don't care value is merely read from the virtual defective memory cell row 56, and the data which have to be made secret are not read. For a write access, data are merely written into the virtual defective memory cell row 56 and the data which have to be made secret are not interpolated.

In a case where the enable signal EB sent from the CPU 3 is in a level "L", the redundant row decoder 59 outputs the alarm signal AR to the CPU 3 when the row address provided by the row address signal X provided by the row address buffer 8 agrees with the row address in the programmed virtual defective memory cell row 56.

As described above, according to the semiconductor device of the second embodiment of the present invention, if the user's access is illegal, the virtual defective memory cell row can be accessed by a simple configuration in which the redundant row decoder is controlled by the enable signal EB representing the legality of an authentication code input by the user. This allows preventing reading or interpolating the data which have to be made secret. If the user's access is illegal and, as a result, the virtual defective memory cell row is accessed, the redundant row decoder outputs the alarm signal to the CPU. Thereby, the CPU can automatically turn off a power supply or lock a key board to prevent an illegal access.

[Modification of Second Embodiment]

In the second embodiment, although each of the virtual defective memory cell row and the redundant memory cell row has one row, the embodiment is not limited thereto. Each of the virtual defective memory cell row and the redundant memory cell row may have a plurality of rows.

[Second Modification of Second Embodiment]

In the second embodiment, although, in a case where the enable signal EB sent from the CPU 3 is in a level "L" (i.e., in a case where the user's access is illegal), the don't care value is read from the virtual defective memory cell row 56 when the row address provided by the row address signal X provided by the row address buffer 8 agrees with the row address in the programmed virtual defective memory cell row 56, it is allowable that any and every word line is caused not to be driven to preclude data from being written at the time of writing them into the memory and to output an undefined value at the time of reading them from the memory.

[Third Modification of Second Embodiment]

In the second embodiment, although, in a case where the enable signal EB sent from the CPU 3 is in a level "L" (i.e., in a case where the user's access is illegal), the don't care value is read from the virtual defective memory cell row 56 when the row address provided by the row address signal X provided by the row address buffer 8 agrees with the row address in the programmed virtual defective memory cell row 56, the operation may be made different between at the time of writing and reading to prevent an illegal access. More specifically, for example, in a case where the enable signal EB is in a level "L", the word line of the redundant memory cell row 5 is driven at the time of writing and the word line of the virtual defective memory cell row 56 is driven at the time of reading to access the memory cells that are different between at the time of writing and reading, allowing preventing the data which have to be made secret from illegally reading.

Third Embodiment

Figure 3:
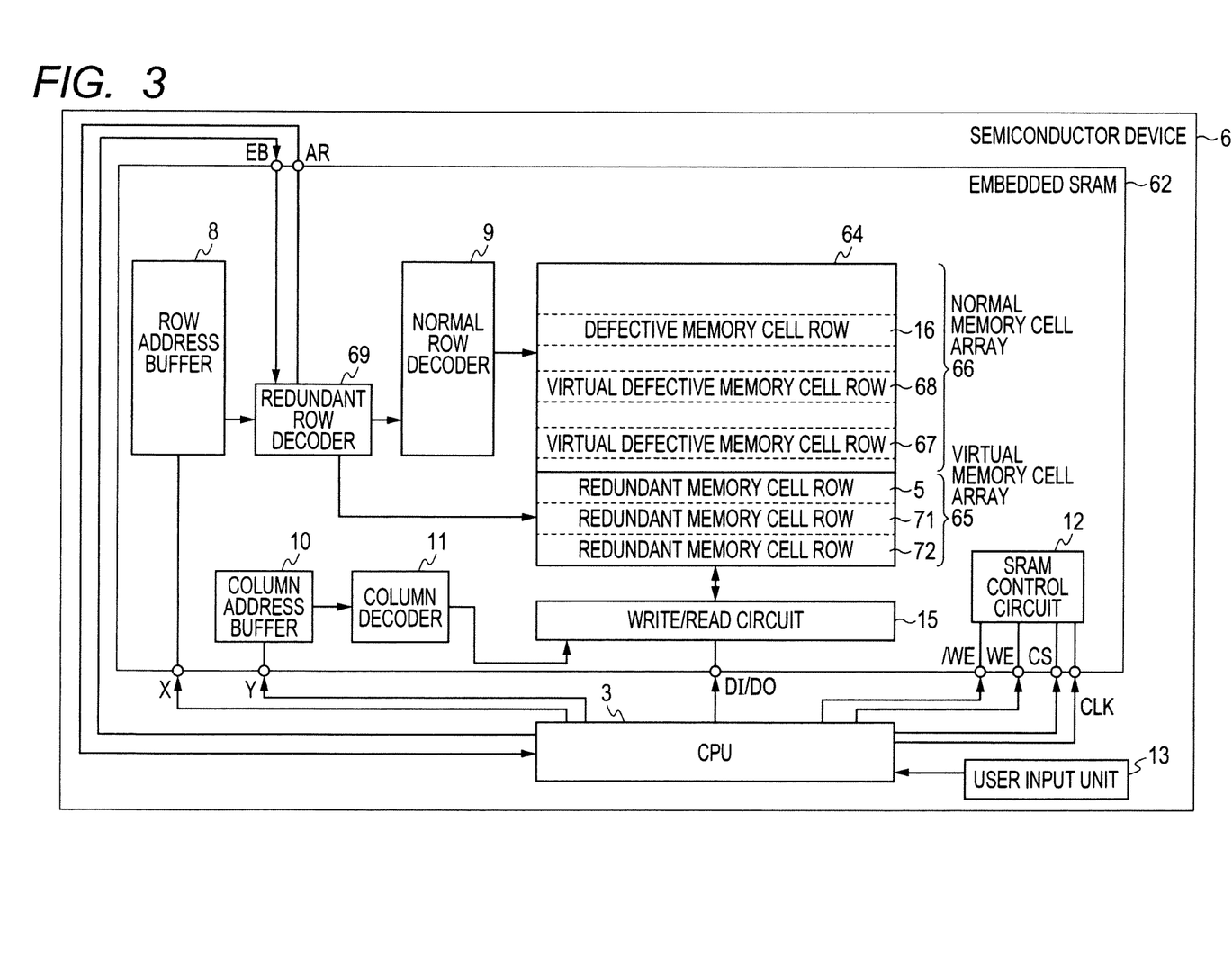
FIG. 3 is a block diagram showing a configuration of a semiconductor device according to a third embodiment of the present invention.

FIG. 3 is a block diagram showing a configuration of a semiconductor device according to a third embodiment of the present invention.

A semiconductor device 61 shown in FIG. 3 is different from the semiconductor device 1 shown in FIG. 1 in the following points. A memory cell array 64 includes a plurality of SRAM cells and is comprised of a normal memory cell array 66 and a redundant memory cell array 65.

The normal memory cell array 66 includes a plurality of normal memory cells arranged in a matrix form. The normal memory cell array 66 includes the defective memory cell row 16 and two virtual defective memory cell rows 67 and 68. A defective row in the normal memory cell array 66 is found in a test before shipment and the row is set as the defective memory cell row 16. Two rows in the normal memory cell array 66 are randomly selected in a test before shipment and their respective selected rows are set in the virtual defective memory cell rows 67 and 68. The don't care value, i.e., the dummy value is written in all the virtual defective memory rows 67 and 68 by the tester.

The redundant memory cell array 65 includes three redundant memory cell rows 5, 71, and 72. The memory cell of the redundant memory cell row 5 stores the data which have to be made secret and essentially stored in the defective memory cell row 16 according to the order of an address. The memory cell of the redundant memory cell row 71 stores the data which have to be made secret and essentially stored in the virtual defective memory cell row 68 according to the order of an address. The memory cell of the redundant memory cell row 72 stores the data which have to be made secret and essentially stored in the virtual defective memory cell row 67 according to the order of an address.

The redundant row decoder 69 includes a program circuit. The program circuit includes a plurality of fuse elements. Some of the plural fuse elements are blown by a tester in a test before shipment, thereby programming the row addresses of the defective memory cell row 16 and the virtual defective memory cell rows 67 and 68.

In a case where the enable signal EB sent from the CPU 3 is in a level "H" (i.e., in a case where the user's access is legal), the redundant row decoder 69 drives the word line of the redundant memory cell row 5 to select the redundant memory cell arranged in the redundant memory cell row 5 and prohibit the drive of the word line by the normal row decoder 9, i.e., the selection of the normal memory cell when the row address provided by the row address signal X provided by the row address buffer 8 agrees with the row address in the programmed defective memory cell row 16. Therefore, in this case, the redundant memory cell row 5 is accessed. For a read access, data which have to be made secret and are stored in the redundant memory cell row 5 are read. For a write access, since data are written in the redundant memory cell row 5, the data which have to be made secret are changed.

In a case where the enable signal EB sent from the CPU 3 is in a level "H" (i.e., in a case where the user's access is legal), the redundant row decoder 69 drives the word lines of the redundant memory cell rows 71 and 72 to select the redundant memory cells arranged in the redundant memory cell rows 71 and 72 and prohibit the drive of the word line by the normal row decoder 9, i.e., the selection of the normal memory cell when the row address provided by the row address signal X provided by the row address buffer 8 agrees with the row addresses in the programmed virtual defective memory cell rows 67 and 68. Therefore, in this case, the redundant memory cell rows 71 and 72 are accessed. For a read access, data which have to be made secret and are stored in the redundant memory cell rows 71 and 72 are read. For a write access, since data are written in the redundant memory cell rows 71 and 72, the data which have to be made secret are changed.

In a case where the enable signal EB sent from the CPU 3 is in a level "L" (i.e., in a case where the user's access is illegal), the redundant row decoder 69 does not drive the word line of the redundant memory cell row 5 when the row address provided by the row address signal X provided by the row address buffer 8 agrees with the row address in the programmed defective memory cell row 16. Therefore, in this case, the defective memory cell row 16 is accessed. For a read access, a reading error merely occurs from the defective memory cell row 16, and data which have to be made secret are not read. For a write access, writing data into the defective memory cell row 16 is merely executed and the data which have to be made secret are not interpolated.

In a case where the enable signal EB sent from the CPU 3 is in a level "L" (i.e., in a case where the user's access is illegal), the redundant row decoder 69 does not drive the word lines of the redundant memory cell rows 71 and 72 when the row address provided by the row address signal X provided by the row address buffer 8 agrees with the row addresses in the programmed virtual defective memory cell rows 67 and 68. Therefore, in this case, the virtual defective memory cell rows 67 and 68 are accessed. For a read access, the don't care value is merely read from the virtual defective memory cell rows 67 and 68, and the data which have to be made secret are not read. For a write access, data are merely written into the virtual defective memory cell rows 67 and 68 and the data which have to be made secret are not interpolated.

In a case where the enable signal EB sent from the CPU 3 is in a level "L", the redundant row decoder 69 outputs the alarm signal AR to the CPU 3 when the row address provided by the row address signal X provided by the row address buffer 8 agrees with the row address in the programmed defective memory cell row 16, the virtual defective memory cell rows 67 or 68.

As described above, according to the semiconductor device of the third embodiment of the present invention, if the user's access is illegal, the defective memory cell row or the virtual defective memory cell row in which the don't care value is stored can be accessed by a simple configuration in which the redundant row decoder is controlled by the enable signal EB representing the legality of an authentication code input by the user. This allows preventing reading or interpolating the data which have to be made secret. If the user's access is illegal and, as a result, the defective memory cell row or the virtual defective memory cell row is accessed, the redundant row decoder outputs the alarm signal to the CPU. Thereby, the CPU can automatically turn off a power supply or lock a key board to prevent an illegal access.

[Modification of Third Embodiment]

In the third embodiment, although each of the defective memory cell row and the redundant memory cell row replaced therewith has one row, the embodiment is not limited thereto. Each of the defective memory cell row and the redundant memory cell row replaced therewith may have a plurality of rows. In the third embodiment, although each of the virtual defective memory cell row and the redundant memory cell row replaced therewith has two rows, the embodiment is not limited thereto. Each of the virtual defective memory cell row and the redundant memory cell row replaced therewith may have three rows or more.

Fourth Embodiment

Figure 4:
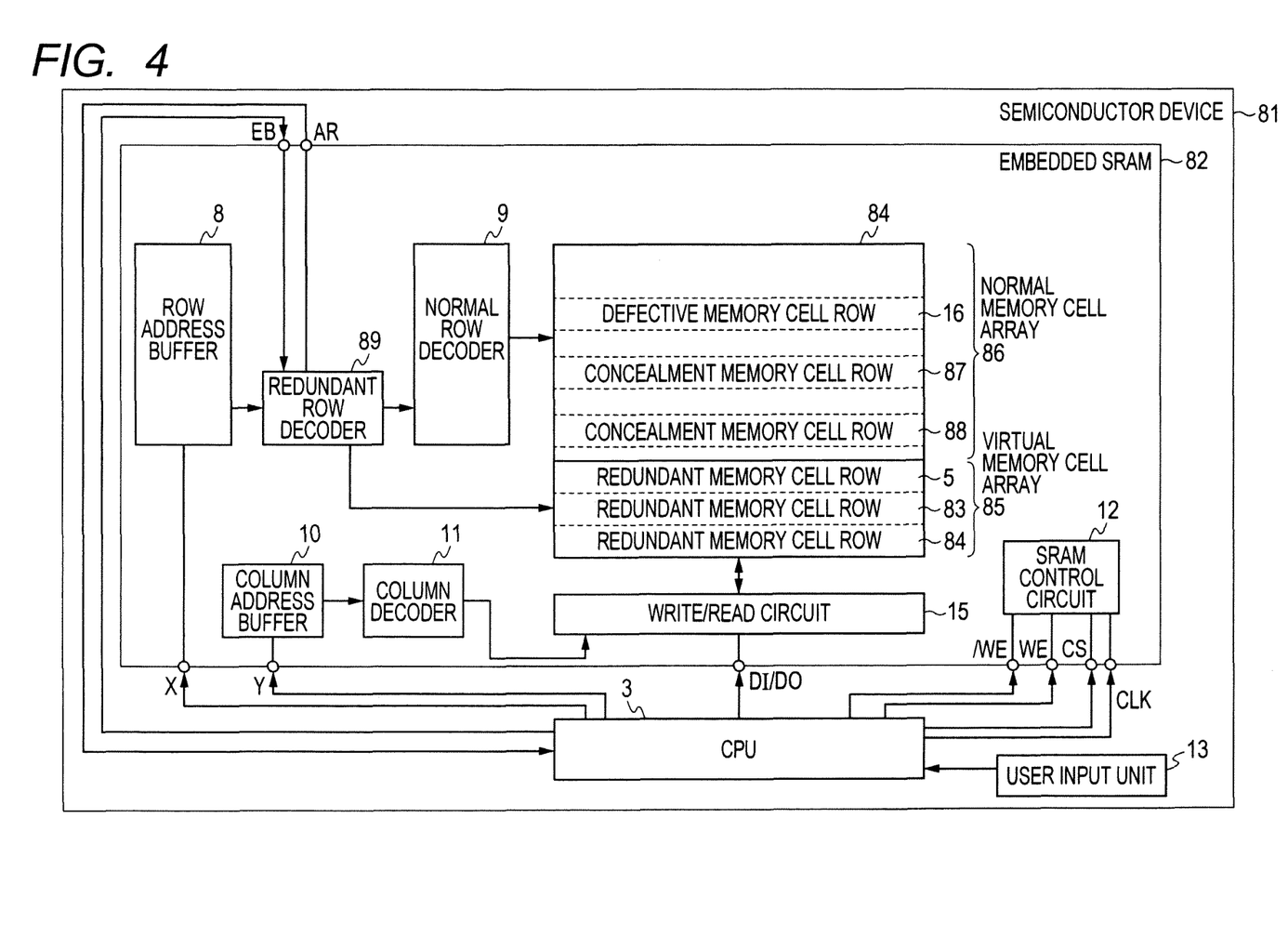
FIG. 4 is a block diagram showing a configuration of a semiconductor device according to a fourth embodiment of the present invention.

FIG. 4 is a block diagram showing a configuration of a semiconductor device according to a fourth embodiment of the present invention.

A semiconductor device 81 shown in FIG. 4 is different from the semiconductor device 1 shown in FIG. 1 in the following points. A memory cell array 84 includes a plurality of SRAM cells and is comprised of a normal memory cell array 86 and a redundant memory cell array 85.

The normal memory cell array 86 includes a plurality of normal memory cells arranged in a matrix form. The normal memory cell array 86 includes the defective memory cell row 16 and two secrecy defective memory cell rows 87 and 88.

A defective row in the normal memory cell array 86 is found in a test before shipment and the row is set as the defective memory cell row 16. Two rows in the normal memory cell array 86 are randomly selected in a test before shipment and their respective selected rows are set in the secrecy memory cell rows 87 and 88. All secrecy memory cells in the secrecy memory cell rows 87 and 88 store the data which have to be made secret. Alternatively, only a part of the secrecy memory cells in the secrecy memory cell rows 87 and 88 may store the data which have to be made secret.

The redundant memory cell array 85 includes three redundant memory cell rows 5, 83, and 84. The memory cell of the redundant memory cell row 5 stores the data which have to be made secret and essentially stored in the defective memory cell row 16 according to the order of an address. The don't care value, i.e., the dummy value is written in the redundant memory rows 83 and 84 by the tester in a test before shipment.

The redundant row decoder 89 includes a program circuit. The program circuit includes a plurality of fuse elements. Some of the plural fuse elements are blown by a tester in a test before shipment, thereby programming the row addresses of the defective memory cell row 16 and the secrecy memory cell rows 87 and 88.

In a case where the enable signal EB sent from the CPU 3 is in a level "H" (i.e., in a case where the user's access is legal), the redundant row decoder 89 drives the word line of the redundant memory cell row 5 to select the redundant memory cell arranged in the redundant memory cell row 5 and prohibit the drive of the word line by the normal row decoder 9, i.e., the selection of the normal memory cell when the row address provided by the row address signal X provided by the row address buffer 8 agrees with the row address in the programmed defective memory cell row 16. Therefore, in this case, the redundant memory cell row 5 is accessed. For a read access, data which have to be made secret and are stored in the redundant memory cell row 5 are read. For a write access, since data are written in the redundant memory cell row 5, the data which have to be made secret are changed.

In a case where the enable signal EB sent from the CPU 3 is in a level "H" (i.e., in a case where the user's access is legal), the redundant row decoder 89 does not drive the word lines of the redundant memory cell rows 83 and 84 when the row address provided by the row address signal X provided by the row address buffer 8 agrees with the row addresses in the programmed secrecy memory cell rows 87 and 88. Therefore, in this case, the secrecy memory cell rows 87 and 88 are accessed. For a read access, the data which have to be made secret and are stored in the secrecy memory cell rows 87 and 88 are read. For a write access, since data are written in the secrecy memory cell rows 87 and 88, the data which have to be made secret are changed.

In a case where the enable signal EB sent from the CPU 3 is in a level "L" (i.e., in a case where the user's access is illegal), the redundant row decoder 89 does not drive the word line of the redundant memory cell row 5 when the row address provided by the row address signal X provided by the row address buffer 8 agrees with the row address in the programmed defective memory cell row 16. Therefore, in this case, the defective memory cell row 16 is accessed. For a read access, a reading error merely occurs from the defective memory cell row 16, and data which have to be made secret are not read. For a write access, writing data into the defective memory cell row 16 is merely executed and the data which have to be made secret are not interpolated.

In a case where the enable signal EB sent from the CPU 3 is in a level "L" (i.e., in a case where the user's access is illegal), the redundant row decoder 89 drives the word lines of the redundant memory cell rows 83 and 84 to select the redundant memory cell arranged in the redundant memory cell rows 83 and 84 and prohibit the drive of the word line by the normal row decoder 9, i.e., the selection of the normal memory cell when the row address provided by the row address signal X provided by the row address buffer 8 agrees with the row addresses in the programmed secrecy memory cell rows 87 and 88. Therefore, in this case, the redundant memory cell rows 83 and 84 are accessed. For a read access, only the don't care value is read from the redundant memory cell rows 83 and 84, and the data which have to be made secret are not read. For a write access, data are merely written into the virtual defective memory cell rows 67 and 68 and the data which have to be made secret are not interpolated.

In a case where the enable signal EB sent from the CPU 3 is in a level "L", the redundant row decoder 89 outputs the alarm signal AR to the CPU 3 when the row address provided by the row address signal X provided by the row address buffer 8 agrees with the row address in the programmed defective memory cell row 16, the secrecy memory cell rows 87 or 88.

As described above, according to the semiconductor device of the fourth embodiment of the present invention, if the user's access is illegal, the defective memory cell row or the redundant memory cell row in which the don't care value is stored can be accessed by a simple configuration in which the redundant row decoder is controlled by the enable signal EB representing the legality of an authentication code input by the user. This allows preventing reading or interpolating the data which have to be made secret. If the user's access is illegal and, as a result, the defective memory cell row or the redundant memory cell row in which the don't care value is stored is accessed, the redundant row decoder outputs the alarm signal to the CPU. Thereby, the CPU can automatically turn off a power supply or lock a key board to prevent an illegal access.

[Modification of Fourth Embodiment]

In the fourth embodiment, although each of the defective memory cell row and the redundant memory cell row replaced therewith has one row, the embodiment is not limited thereto. Each of the defective memory cell row and the redundant memory cell row replaced therewith may have a plurality of rows. In the fourth embodiment, although each of the secrecy memory cell row and the redundant memory cell row replaced therewith has two rows, the embodiment is not limited thereto. Each of the secrecy memory cell row and the redundant memory cell row replaced therewith may have three rows or more.

Fifth Embodiment

Figure 5:
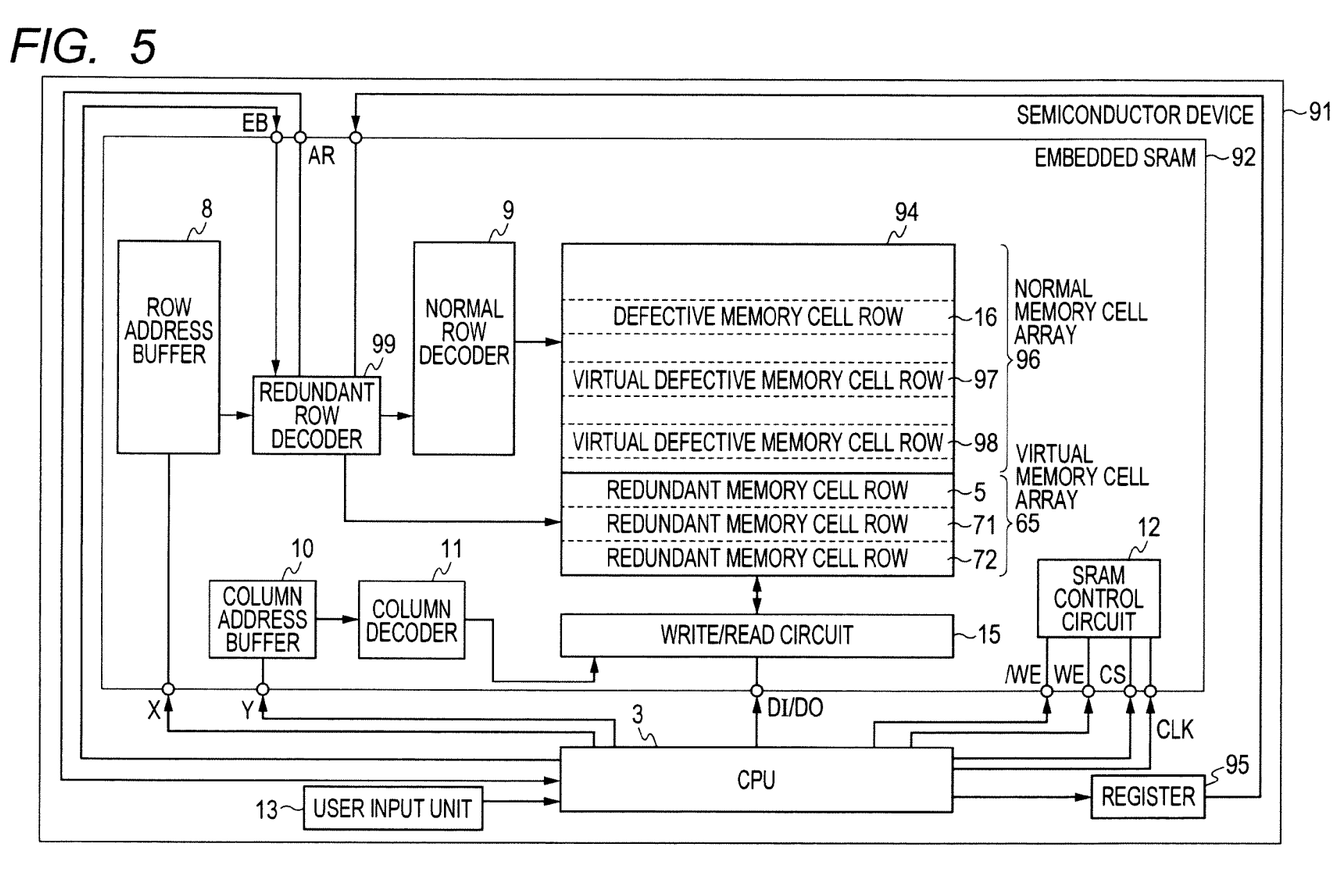
FIG. 5 is a block diagram showing a configuration of a semiconductor device according to a fifth embodiment of the present invention.

FIG. 5 is a block diagram showing a configuration of a semiconductor device according to a fifth embodiment of the present invention.

A semiconductor device 91 shown in FIG. 5 is different from the semiconductor device 1 shown in FIG. 1 in the following points. A memory cell array 94 includes a plurality of SRAM cells and is comprised of a normal memory cell array 96 and a redundant memory cell array 65.

The user input unit 13 receives the designation of a virtual defective memory cell row in the normal memory cell array 96 by the user.

The CPU 3 stores the row address of the virtual defective memory cell row designated by the user in a register 95. The CPU 3 provides the write/read circuit 15 with the don't care value, i.e., the write data DI of a dummy value to write the don't care value in all the virtual defective memory cells of the virtual defective memory cell row shown by the row address stored in the register 95. Alternatively, the write/read circuit 15 may write the don't care value in a part of the virtual defective memory cells of the virtual defective memory cell row shown by the row address stored in the register 95.

The normal memory cell array 96 includes a plurality of normal memory cells arranged in a matrix form. The normal memory cell array 96 includes the defective memory cell row 16 and virtual defective memory cell rows 97 and 98 set by the user. The following description assumes that two rows are set as virtual defective memory cell rows by the user.

A defective row in the normal memory cell array 96 is found in a test before shipment and the row is set as the defective memory cell row 16.

The redundant memory cell array 65 includes three redundant memory cell rows 5, 71, and 72. The memory cell of the redundant memory cell row 5 stores the data which have to be made secret and essentially stored in the defective memory cell row 16 according to the order of an address. The memory cell of the redundant memory cell row 71 stores the data which have to be made secret and essentially stored in the virtual defective memory cell row 97 according to the order of an address. The memory cell of the redundant memory cell row 72 stores the data which have to be made secret and essentially stored in the virtual defective memory cell row 98 according to the order of an address.

The redundant row decoder 99 includes a program circuit. The program circuit includes a plurality of fuse elements. Some of the plural fuse elements are blown by a tester in a test before shipment, thereby programming the row address of the defective memory cell row 16.

In a case where the enable signal EB sent from the CPU 3 is in a level "H" (i.e., in a case where the user's access is legal), the redundant row decoder 99 drives the word line of the redundant memory cell row 5 to select the redundant memory cell arranged in the redundant memory cell row 5 and prohibit the drive of the word line by the normal row decoder 9, i.e., the selection of the normal memory cell when the row address provided by the row address signal X provided by the row address buffer 8 agrees with the row address in the programmed defective memory cell row 16. Therefore, in this case, the redundant memory cell row 5 is accessed. For a read access, data which have to be made secret and are stored in the redundant memory cell row 5 are read. For a write access, since data are written in the redundant memory cell row 5, the data which have to be made secret are changed.

In a case where the enable signal EB sent from the CPU 3 is in a level "H" (i.e., in a case where the user's access is legal), the redundant row decoder 99 drives the word lines of the redundant memory cell rows 71 and 72 to select the redundant memory cells arranged in the redundant memory cell rows 71 and 72 and prohibit the drive of the word line by the normal row decoder 9, i.e., the selection of the normal memory cell when the row address provided by the row address signal X provided by the row address buffer 8 agrees with the row addresses in the virtual defective memory cell rows 97 and 98 written in the register 95 by the user. Therefore, in this case, the redundant memory cell rows 71 and 72 are accessed. For a read access, data which have to be made secret and are stored in the redundant memory cell rows 71 and 72 are read. For a write access, since data are written in the redundant memory cell rows 71 and 72, the data which have to be made secret are changed.

In a case where the enable signal EB sent from the CPU 3 is in a level "L" (i.e., in a case where the user's access is illegal), the redundant row decoder 99 does not drive the word line of the redundant memory cell row 5 when the row address provided by the row address signal X provided by the row address buffer 8 agrees with the row address in the programmed defective memory cell row 16. Therefore, in this case, the defective memory cell row 16 is accessed. For a read access, a reading error merely occurs from the defective memory cell row 16, and data which have to be made secret are not read. For a write access, writing data into the defective memory cell row 16 is merely executed and the data which have to be made secret are not interpolated.

In a case where the enable signal EB sent from the CPU 3 is in a level "L" (i.e., in a case where the user's access is illegal), the redundant row decoder 99 does not drive the word lines of the redundant memory cell rows 71 and 72 when the row address provided by the row address signal X provided by the row address buffer 8 agrees with the row addresses in the virtual defective memory cell rows 97 and 98 written in the register 95 by the user. Therefore, in this case, the virtual defective memory cell rows 97 and 98 are accessed. For a read access, the don't care value is merely read from the defective memory cell rows 97 and 98, and the data which have to be made secret are not read. For a write access, data are merely written into the virtual defective memory cell rows 97 and 98 and the data which have to be made secret are not interpolated.

In a case where the enable signal EB sent from the CPU 3 is in a level "L", the redundant row decoder 99 outputs the alarm signal AR to the CPU 3 when the row address provided by the row address signal X provided by the row address buffer 8 agrees with the row addresses in the programmed defective memory cell row 16, the virtual defective memory cell rows 97 and 98 written in the register 95 by the user.

As described above, according to the semiconductor device of the fifth embodiment of the present invention, if the user's access is illegal, the defective memory cell row or the virtual defective memory cell row storing the don't care value and specified by the user can be accessed by a simple configuration in which the redundant row decoder is controlled by the enable signal EB representing the legality of an authentication code input by the user. This allows preventing reading or interpolating the data which have to be made secret. If the user's access is illegal and, as a result, the defective memory cell row and the virtual defective memory cell row specified by the user are accessed, the redundant row decoder outputs the alarm signal to the CPU. Thereby, the CPU can automatically turn off a power supply or lock a key board to prevent an illegal access.

[Modification of Fifth Embodiment]

In the fifth embodiment, although each of the defective memory cell row and the redundant memory cell row replaced therewith has one row, the embodiment is not limited thereto. Each of the defective memory cell row and the redundant memory cell row replaced therewith may have a plurality of rows. In the fifth embodiment, although each of the virtual defective memory cell row specified by the user and the redundant memory cell row replaced therewith has two rows, the embodiment is not limited thereto. Each of the virtual defective memory cell row specified by the user and the redundant memory cell row replaced therewith may have three rows or more.

In the fifth embodiment, although the user sets the virtual defective memory cell row, the embodiment is not limited thereto and the user may set the secrecy memory cell row as is the case with the fourth embodiment.

Sixth Embodiment

In the semiconductor device in FIG. 1, the memory cell in the row with the normal memory cell array is replaced and the redundant row decoder is controlled by the enable signal on the premise of a configuration having the redundant memory cell row and the redundant row decoder for that purpose. Instead of that, in the sixth embodiment, the memory cell in the column with the normal memory cell array is replaced.

Figure 6:
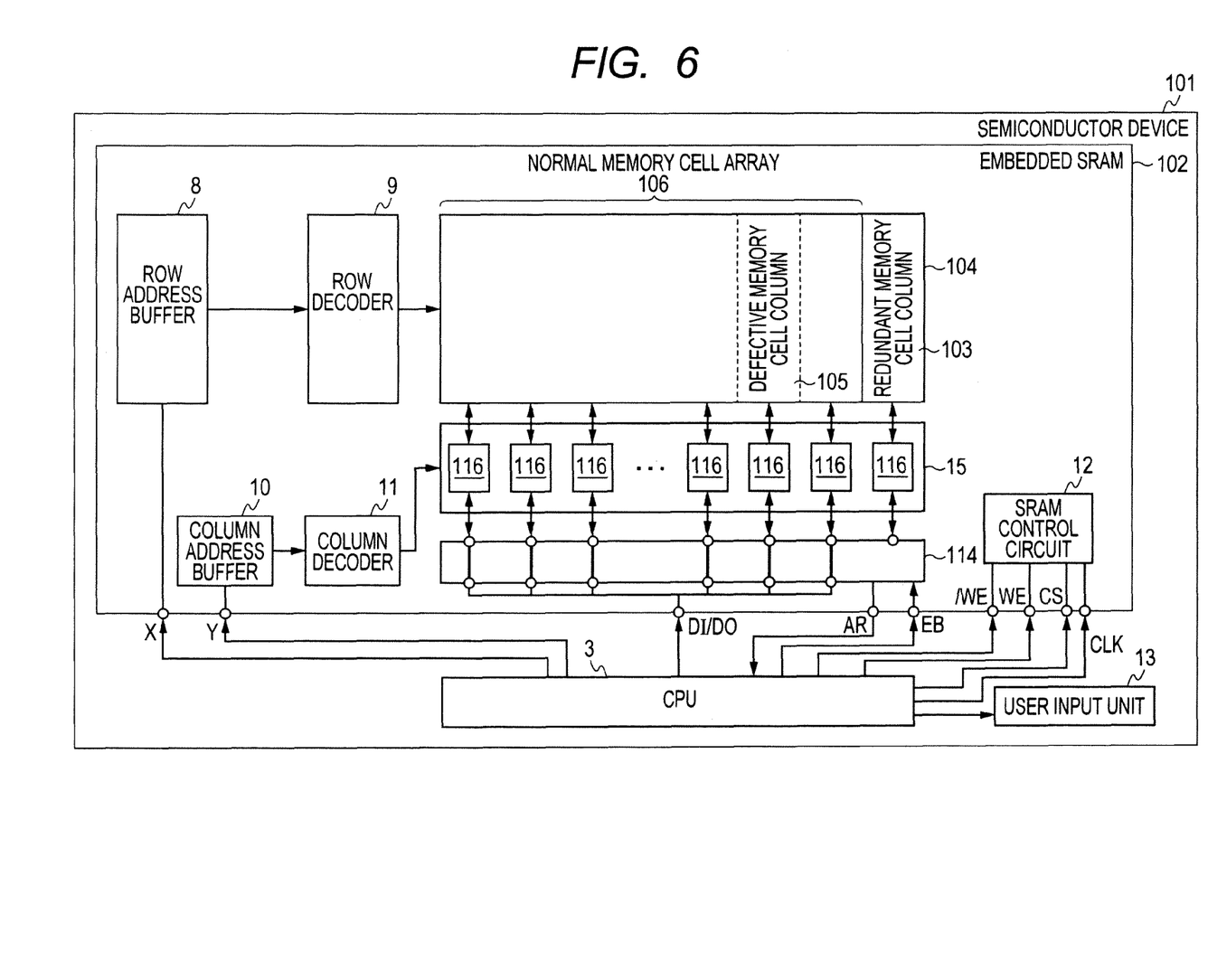
FIG. 6 is a block diagram showing a configuration of a semiconductor device according to a six embodiment of the present invention.
Figure 7:
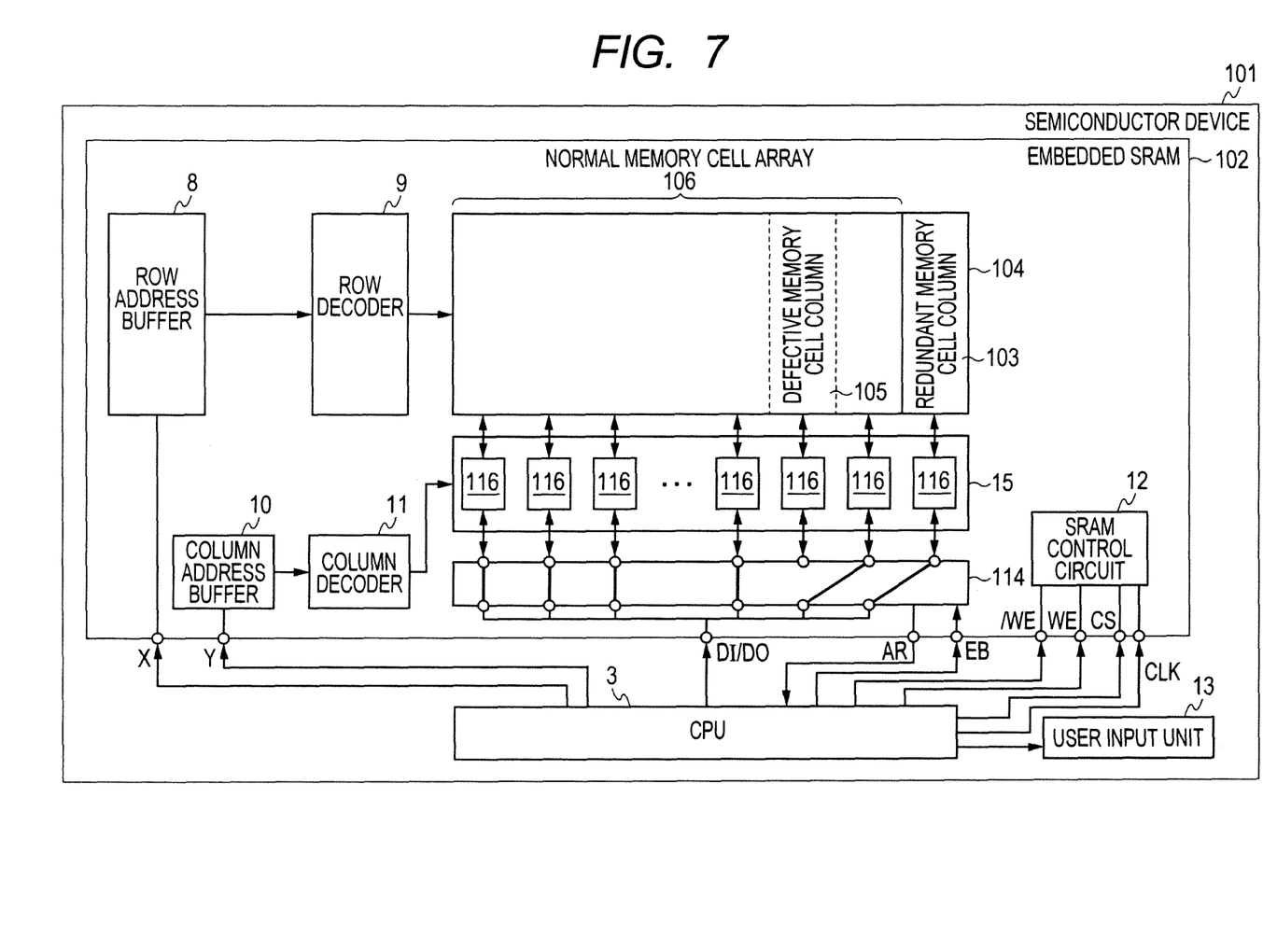
FIG. 7 is a block diagram showing a configuration of a semiconductor device according to the six embodiment of the present invention.

FIGS. 6 and 7 are block diagrams showing a configuration of a semiconductor device according to the sixth embodiment of the present invention. A semiconductor device 101 shown in FIGS. 6 and 7 is different from the semiconductor device 1 shown in FIG. 1 in the following points.

A memory cell array 104 includes a plurality of SRAM cells and is comprised of a normal memory cell array 106 and a redundant memory cell column 103.

The normal memory cell array 106 includes a plurality of normal memory cells arranged in a matrix form. The normal memory cell array 106 includes a defective memory cell column 105. The defective memory cell column 105 includes at least one bit defective memory. A defective column in the normal memory cell array 106 is found in a test before shipment and the column is set as the defective memory cell column 105.

The redundant memory cell column 103 is arranged in one column and includes a plurality of redundant memory cells. The memory cell of the redundant memory cell column 103 stores the data which have to be made secret and essentially stored in the memory cell of the defective memory cell column 105 according to the order of an address.

The redundant column control circuit 114 includes a program circuit. The program circuit includes a plurality of fuse elements. Some of the plural fuse elements are blown by a tester in a test before shipment, thereby programming the column address of the defective memory cell column 105.

In a case where the enable signal EB sent from the CPU 3 is in a level "H" (i.e., in a case where the user's access is legal), the redundant column control circuit 114 shifts coupling the memory cell column (i.e., a sense amplifier/write driver 116) with I/O so as to avoid the defective memory cell column 105 including the defective memory when the column address provided by the column address signal Y provided by the column address buffer 10 agrees with the column address in the programmed defective memory cell column 105. Therefore, in this case, the redundant memory cell column 103 is accessed. For a read access, data which have to be made secret and are stored in the redundant memory cell column 103 are read. For a write access, since data are written in the redundant memory cell column 103, the data which have to be made secret are changed.

In a case where the enable signal EB sent from the CPU 3 is in a level "L" (i.e., in a case where the user's access is illegal), the redundant column control circuit 114 does not shift coupling the memory cell column with I/O as shown in FIG. 6 when the column address provided by the column address signal Y provided by the column address buffer 10 agrees with the column address in the programmed defective memory cell column 105. Therefore, in this case, the defective memory cell column 105 is accessed. For a read access, a reading error merely occurs from the defective memory cell column 105, and data which have to be made secret are not read. For a write access, writing data into the defective memory cell column 105 is merely executed and the data which have to be made secret are not interpolated.

In a case where the enable signal EB sent from the CPU 3 is in a level "L", the redundant column control circuit 114 outputs the alarm signal AR to the CPU 3 when the column address provided by the column address signal Y provided by the column address buffer 10 agrees with the column address in the programmed defective memory cell column 105.

As described above, according to the semiconductor device of the sixth embodiment of the present invention, if the user's access is illegal, the defective memory cell column can be accessed by a simple configuration in which the redundant column control circuit is controlled by the enable signal EB representing the legality of an authentication code input by the user. This allows preventing reading or interpolating the data which have to be made secret. If the user's access is illegal and, as a result, the defective memory cell row is accessed, the redundant column control circuit outputs the alarm signal to the CPU. Thereby, the CPU can automatically turn off a power supply or lock a key board to prevent an illegal access.

[Modification]

The present invention is not limited to the aforementioned embodiments but includes the modification described below.
(1) The application to various redundant circuits: for the relief of a memory block by a block replacement, the user access can be controlled by the enable control as is the case with row and column redundancy.

The present invention is applicable to a redundancy circuit applied to a memory or an LSI on which a general redundancy circuit is mounted. The redundancy (relief) circuit may be controlled by mechanisms of various redundancy circuits and an enable signal.

The semiconductor device includes an input unit configured to receive an authentication code input by a user, a control unit configured to determine whether a user's access is legal based on the input authentication code and activate an enable signal if the user's access is legal, a plurality of redundancy circuits, and a redundancy circuit control configured to prohibit the operation of the redundancy circuit specified by the control unit when the specified redundancy circuit agrees with a predetermined normal redundancy circuit only if the enable signal is activated to select any of the redundancy circuits.

It is to be construed that the embodiments disclosed above are exemplary in all respects and not restrictive. It is intended that the scope of the present invention is shown by not the above description but the scope of a claim and includes all changes in the meaning and scope equivalent to the claim.

What is claimed is:

1. A semiconductor device comprising:
an input unit configured to receive an authentication code input;
a central processing unit configured to determine whether an access is legal or illegal based on the inputted authentication code, activate an enable signal if the access is legal and deactivate the enable signal if the access is illegal;
an internal memory which has:
a memory array including:
first memory cells;
second memory cells to which a first address is assigned;
third memory cells to which the first address is assigned;
a first decoder configured to select the first or second memory cells based on an address specified by the central processing unit; and
a second decoder configured to select the third memory cells and prohibit the selection of the second memory cells by the first decoder when the address specified by the central processing unit agrees with the first address if the enable signal is activated, and configured not to select the third memory cells, allow the selection of the second memory cells by the first decoder and provide an alarm signal to the central processing unit when the address specified by the central processing unit agrees with the first address if the enable signal is deactivated.

2. The semiconductor device according to claim 1, wherein the second memory cells include a defective memory cell, and
wherein the third memory cells are redundant memory cells which data to be made secret.

3. The semiconductor device according to claim 1, wherein the second memory cells include a virtual defective memory cell in which a don't care value is stored, and
wherein the third memory cells are redundant memory cells which store data to be made secret.

4. The semiconductor device according to claim 1, wherein the second memory cells include a defective memory cell and a virtual defective memory cell in which a don't care value is stored, and
wherein the third memory cells are redundant memory cells which store data to be made secret.

5. The semiconductor device according to claim 3, wherein the input unit includes a write circuit configured to receive the designation of the virtual defective memory cell from a user and write a don't care value in the virtual defective memory cell.

* * * * *